US010820039B2

(12) United States Patent
Xu et al.

(10) Patent No.: US 10,820,039 B2
(45) Date of Patent: Oct. 27, 2020

(54) VIDEO PLAYING METHOD AND TERMINAL DEVICE

(71) Applicant: Huawei Technologies Co., Ltd., Shenzhen (CN)

(72) Inventors: Fangfang Xu, Nanjing (CN); Hao Peng, Nanjing (CN); Tao Yang, Shenzhen (CN); Zifu Hu, Nanjing (CN); Wenjie Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/445,548

(22) Filed: Jun. 19, 2019

(65) Prior Publication Data

US 2019/0306561 A1 Oct. 3, 2019

Related U.S. Application Data

(63) Continuation of application No. PCT/CN2017/117238, filed on Dec. 19, 2017.

(30) Foreign Application Priority Data

Dec. 21, 2016 (CN) .......................... 2016 1 1193581

(51) Int. Cl.
*H04N 21/431* (2011.01)
*H04N 21/44* (2011.01)
(Continued)

(52) U.S. Cl.
CPC ....... *H04N 21/4316* (2013.01); *G06F 3/0486* (2013.01); *G06F 3/0488* (2013.01);
(Continued)

(58) Field of Classification Search
CPC .............................................. H04N 21/47217
See application file for complete search history.

(56) References Cited

U.S. PATENT DOCUMENTS

2008/0074550 A1* 3/2008 Park ....................... H04N 5/445
348/565
2008/0225171 A1* 9/2008 Shih ........................ H04N 5/45
348/565
(Continued)

FOREIGN PATENT DOCUMENTS

CN 101155281 A 4/2008
CN 104994314 A 10/2015
(Continued)

OTHER PUBLICATIONS

Tatiana Casino: "iOS 9 Picture in Picture: 9 Things You Need to Know", XP055372159, Aug. 7, 2015, 4 pages.
(Continued)

*Primary Examiner* — Paulos M Natnael
(74) *Attorney, Agent, or Firm* — Slater Matsil, LLP

(57) ABSTRACT

A video playing method and a terminal device, the method including starting, by a terminal device, at least two playing instances based on an operation instruction of a user, where each of the at least two playing instances corresponds to a video display window, and where the video display window comprises a first video display window and a second video display window, playing first channel content in the first video display window and playing second channel content in the second video display window according to a display mode selected by the user, detecting an operation gesture of the user on the first video display window or the second video display window, and adjusting playing modes of the first channel content and the second channel content according to the operation gesture of the user and a current display mode.

16 Claims, 11 Drawing Sheets

(51) Int. Cl.
*H04N 21/482* (2011.01)
*H04N 21/472* (2011.01)
*H04N 21/485* (2011.01)
*G06F 3/0486* (2013.01)
*G06F 3/0488* (2013.01)
*H04N 5/45* (2011.01)

(52) U.S. Cl.
CPC ...... *G06F 3/04883* (2013.01); *G06F 3/04886* (2013.01); *H04N 5/45* (2013.01); *H04N 21/4312* (2013.01); *H04N 21/4314* (2013.01); *H04N 21/44008* (2013.01); *H04N 21/47205* (2013.01); *H04N 21/482* (2013.01); *H04N 21/4858* (2013.01)

(56) References Cited

U.S. PATENT DOCUMENTS

| | | | |
|---|---|---|---|
| 2014/0109125 A1* | 4/2014 | Kim | H04N 21/44213 725/14 |
| 2014/0178033 A1 | 6/2014 | He | |
| 2015/0163445 A1* | 6/2015 | Park | H04N 5/50 348/565 |
| 2015/0312508 A1* | 10/2015 | Phang | H04N 21/42222 348/552 |
| 2015/0334335 A1* | 11/2015 | White | H04N 21/4126 348/734 |
| 2017/0272805 A1* | 9/2017 | Richman | H04N 21/4312 |

FOREIGN PATENT DOCUMENTS

| | | |
|---|---|---|
| CN | 105163165 A | 12/2015 |
| CN | 105472428 A | 4/2016 |
| CN | 105828162 A | 8/2016 |
| CN | 106028143 A | 10/2016 |
| CN | 106802759 A | 6/2017 |
| EP | 1903791 A2 | 3/2008 |
| WO | 2009126697 A1 | 10/2009 |

OTHER PUBLICATIONS

Anonymous: "Adding Picture-in-picture," Android Developers, XP055372194, Nov. 7, 2016, 4 pages.

Ritchie, R., "Picture-in-picture multitasking for iPad in iOS 9: Explained," XP055371951, Internet article, Aug. 17, 2015, 12 pages.

* cited by examiner

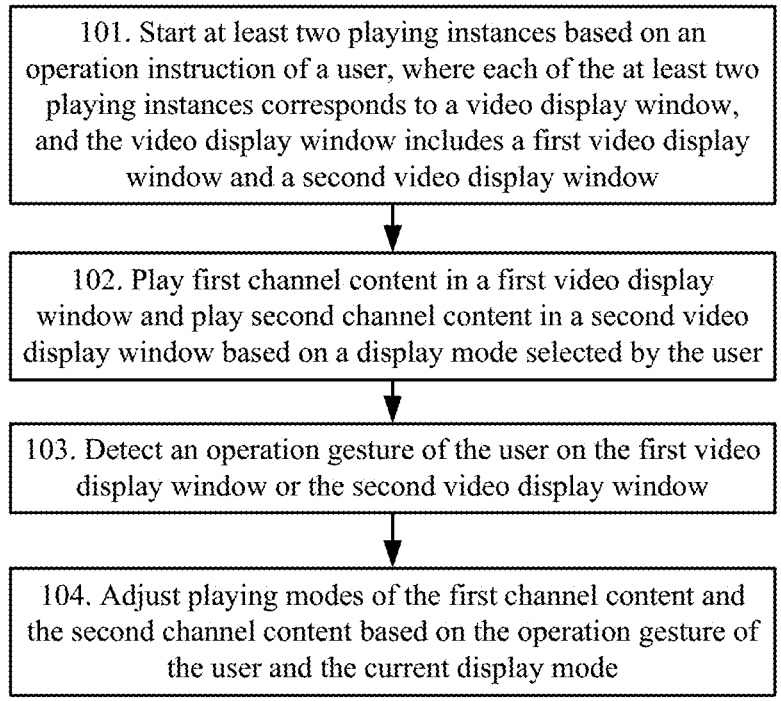
FIG. 1
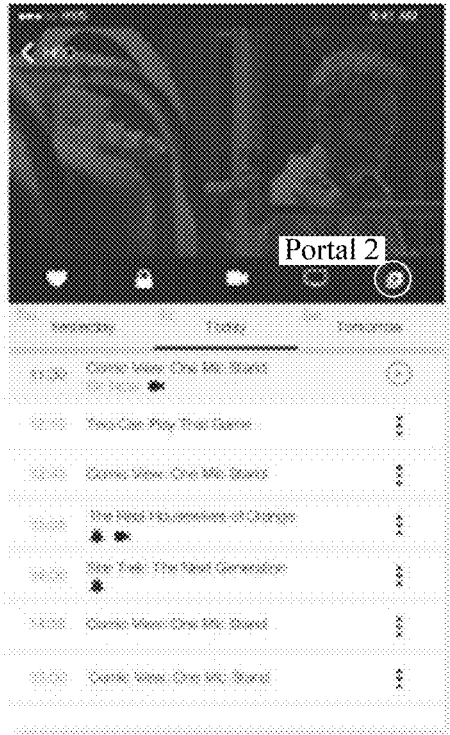
FIG. 2(a)  FIG. 2(b)

VIDEO PLAYING METHOD AND TERMINAL DEVICE

CROSS-REFERENCE TO RELATED APPLICATIONS

This application is a continuation of International Application No. PCT/CN2017/117238, filed on Dec. 19, 2017, which claims priority to Chinese Patent Application No. 201611193581.0, filed on Dec. 21, 2016. The disclosures of the aforementioned applications are hereby incorporated by reference in their entireties.

TECHNICAL FIELD

Embodiments of this application relate to the image display field, and more specifically, to a video playing method and a terminal device.

BACKGROUND

As video products develop rapidly and content becomes increasingly adverse, it is more difficult for a user to choose a channel to watch. Especially in a prime time when television (TV) programs are played, the user expects to simultaneously watch a plurality of TV programs. The user can select a satisfactory channel program only by continuously switching between channels. However, during channel switching, the user may not be satisfied with a program when switching to a channel but satisfied with a program when leaving the channel. Consequently, the user misses the program.

In other words, current video products do not support simultaneous playing of a plurality of channels, and support only channel switching, and finally, the user can only watch a selected channel program. Therefore, when the user uses a video product to watch a video, operability is low, and user experience is poor.

SUMMARY

Embodiments of this application provide a video playing method and a terminal device, so as to improve user experience.

According to a first aspect, this application provides a video playing method, and the method includes starting at least two playing instances based on an operation instruction of a user, where each of the at least two playing instances corresponds to a video display window, and the video display window includes a first video display window and a second video display window, playing first channel content in the first video display window and playing second channel content in the second video display window based on a display mode selected by the user, detecting an operation gesture of the user on the first video display window or the second video display window, and adjusting playing modes of the first channel content and the second channel content based on the operation gesture of the user and the current display mode.

The terminal device starts the at least two playing instances based on the operation instruction of the user, plays the first channel content in the first video display window and plays the second channel content in the second video display window based on the display mode selected by the user, detects the operation gesture of the user on the first video display window or the second video display window, and adjusts the playing modes of the first channel content and the second channel content based on the operation gesture of the user and the current display mode. In this way, the terminal device may further adjust playing of the channel content based on the detected operation gesture after playing the channel content. Compared with the prior art in which once a video product is played, a size of a window displaying channel content is fixed, and a playing mode is fixed, the embodiments of this application improve operability of the terminal device, and diversify video watching modes, thereby improving user experience.

In some possible implementations, the starting at least two playing instances based on an operation instruction of a user includes detecting a click operation of the user on a multi-channel simultaneous watching portal displayed on a display screen of the terminal device, displaying a channel selection page based on the click operation of the user, where the channel selection page includes M video icons corresponding to M pieces of channel content, M is a positive integer, and M≥2, receiving a selection operation of the user on at least two of the M video icons, and starting at least two playing instances based on the selection operation of the user.

The terminal device may play, according to a requirement of the user, a plurality of pieces of channel content selected by the user, thereby achieving multi-channel simultaneous watching, improving operability of the terminal device, and improving user experience.

In some possible implementations, the display mode selected by the user includes a Picture in Picture (PiP) mode and a Picture out Picture (PoP) mode, and the playing first channel content in the first video display window and playing second channel content in the second video display window based on a display mode selected by the user includes if the display mode selected by the user is the PiP mode, determining the first video display window as a primary display window, determining the second video display window as a secondary display window, and superimposing the second video display window on the first video display window.

The user may select either of the PiP mode and the PoP mode according to a requirement. For example, the user may choose to superimpose the secondary display window on the primary display window, thereby further improving user experience.

In some possible implementations, the playing first channel content in the first video display window and playing second channel content in the second video display window based on a display mode selected by the user includes if the display mode selected by the user is the PoP mode, displaying the first video display window and the second video display window side by side.

The user may select either of the PiP mode and the PoP mode according to a requirement. For example, the user may choose to display the display windows side by side, thereby further improving user experience.

In some possible implementations, the operation gesture of the user includes a scaling operation on the second video display window, and the adjusting playing modes of the first channel content and the second channel content based on the operation gesture of the user and the current display mode includes determining a scaling multiple of the second video display window, adjusting a size of the second video display window based on the scaling multiple, and playing the second channel content in the adjusted second video display window.

The user may perform a pinch operation on a video display window, and the terminal device detects the pinch operation and determines a scaling multiple of the pinch operation on the video display window, and then adjusts a size of the video display window based on the scaling multiple, so that channel content is played within a video display window size with which the user is satisfied, and the user can flexibly control the size of the video display window, thereby improving user experience.

In some possible implementations, the operation gesture of the user includes holding down and dragging the second video display window from a second location to a first location, and the adjusting playing modes of the first channel content and the second channel content based on the operation gesture of the user and the current display mode includes displaying the second video display window at the first location, and playing the second channel content in the second video display window whose location is adjusted.

In the PiP mode, the second video display window is superimposed on the first video display window, and the user may randomly move, according to a requirement, a location at which the second video display window is superimposed on the first video display window, to prevent the second video display window from shielding an important display location of the first video display window, thereby further improving user experience.

In some possible implementations, the operation gesture of the user includes a click operation on the second video display window, and the adjusting playing modes of the first channel content and the second channel content based on the operation gesture of the user and the current display mode includes playing the second channel content in the first video display window, and playing the first channel content in the second video display window.

In the PiP mode, the first video display window may be a full-screen display window, and the second video display window is a window that is of a smaller size and that is superimposed on the first video display window. When the user needs to watch the second channel content in full screen, the user may directly click a coverage area of the second video display window. In this way, the terminal device exchanges the first channel content and the second channel content, to flexibly select a satisfactory video display window for displaying the channel content, thereby improving user experience.

In some possible implementations, the operation gesture of the user includes a click operation on the second video display window, and the adjusting playing modes of the first channel content and the second channel content based on the operation gesture of the user and the current display mode includes playing sound of the second channel content, and turning off sound of the first channel content.

In the PoP mode, if video content currently played by the terminal device is the sound of the first channel content, the user may click a coverage area of the second video display window. In this way, the terminal device turns off the sound of the first channel content after detecting the operation, and plays the second channel content in the second video display window. To be specific, the user may freely select sound of any one of a plurality of pieces of channel content played simultaneously, thereby improving user experience.

In some possible implementations, the operation gesture of the user includes holding down and dragging the second video display window from a second location to a first location, and the adjusting playing modes of the first channel content and the second channel content based on the operation gesture of the user and the current display mode includes determining whether a center point of the second video display window is moved to a coverage area of the first video display window, and if the center point of the second video display window is moved to the coverage area of the first video display window, playing the first channel content in the second video display window, and playing the second channel content in the first video display window.

In the PoP mode, the user moves the second video display window from the second location to the first location, the first location is a location occupied by the first video display window, and the first video display window and the second video display window are displayed side by side. After detecting the operation gesture of the user, the terminal device needs to determine whether the center point of the second video display window is moved to the coverage area of the first video display window. If the center point of the second video display window is moved to the coverage range of the first video display window, the terminal device exchanges the first channel content and the second channel content. To be specific, the second channel content is played in the first video display window, and the first channel content is played in the second video display window. In this way, before dragging the second video display window to the coverage area of the first video display window, the user may abandon the dragging, so that the second channel content can still be displayed in the second video display window, thereby improving user experience.

According to a second aspect, this application provides a terminal device, including a module configured to perform the method according to the first aspect or any possible implementation of the first aspect.

According to a third aspect, this application provides a terminal device, including a processor, a memory, and a display. The memory is configured to store an instruction, the processor is configured to execute the instruction, and a communications interface is configured to communicate with another network element under control of the processor. When the processor executes the instruction stored by the memory, the execution enables the processor to perform the method according to the first aspect or any possible implementation of the first aspect.

According to a fourth aspect, this application provides a computer storage medium, the computer storage medium stores program code, and the program code is used to indicate an instruction for performing the video playing method according to the first aspect or any possible implementation of the first aspect.

According to a fifth aspect, this application provides a computer storage medium, the computer storage medium stores program code, and the program code is executed by the terminal device according to the second aspect or any possible implementation of the second aspect.

Based on the foregoing technical solutions, the terminal device starts the at least two playing instances based on the operation instruction of the user, plays the first channel content in the first video display window and plays the second channel content in the second video display window based on the display mode selected by the user, detects the operation gesture of the user on the first video display window or the second video display window, and adjusts the playing modes of the first channel content and the second channel content based on the operation gesture of the user and the current display mode. In this way, the terminal device may further adjust playing of the channel content based on the detected operation gesture after playing the channel content. Compared with the prior art in which once a video product is played, a size of a window displaying channel content is fixed, and a playing mode is fixed, the embodiments of this application improve operability of the terminal device, and diversify video watching modes, thereby improving user experience.

BRIEF DESCRIPTION OF THE DRAWINGS

FIG. 1 is a schematic flowchart of a video playing method according to an embodiment of this application;

FIG. 2(a), FIG. 2(b), and FIG. 2(c) are schematic diagrams of video playing screen display according to an embodiment of this application;

DETAILED DESCRIPTION OF ILLUSTRATIVE EMBODIMENTS

Embodiments of this application may be applied to a terminal device that can support channel playing using a plurality of video display windows. For example, the terminal device may be a plurality of types of processing devices having a multi-screen display function. For example, the terminal device may be a subscriber unit, a subscriber station, a mobile station, a remote station, a remote terminal, a mobile device, a user terminal, a terminal, a wireless communications device, a user agent, a user apparatus, or user equipment (UE, User Equipment) that has the multi-screen display function, or may be another computing device such as a smartphone, a personal computer, a tablet computer, a cordless phone, a handheld device, or an in-vehicle device that has a screen. However, this application is not limited thereto.

In the prior art, video products do not support simultaneous playing of a plurality of channels, and support only channel switching, and finally, a user can only watch a selected channel program with poor user experience. According to a video playing method in the embodiments of this application, a terminal device supporting multi-channel simultaneous watching can play different channel content in at least two video display windows based on an operation instruction of a user. For example, the at least two video display windows are displayed side by side, or displayed in a superimposed manner. In addition, the user may further adjust a playing mode of channel content by using different operation gestures, for example, scaling a video display window, changing a location at which video content is displayed, and moving the video display window. The embodiments of this application improve operability of the terminal device, and diversify video watching modes, thereby improving user experience.

FIG. 1 is a schematic diagram of a video playing method according to an embodiment of this application. As shown in FIG. 1, the method may be performed by a terminal device, and the method includes the following steps.

101. Start at least two playing instances based on an operation instruction of a user.

Figure 2C:
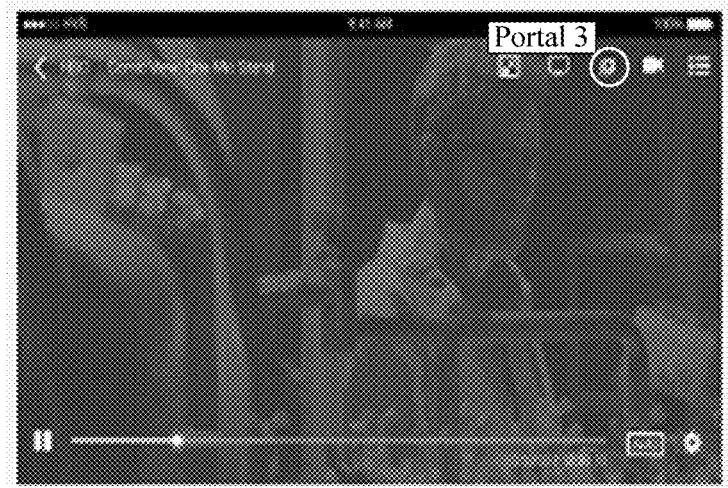
Figure 3:
FIG. 3 is a schematic diagram of video playing screen display according to another embodiment of this application.
Figure 4:
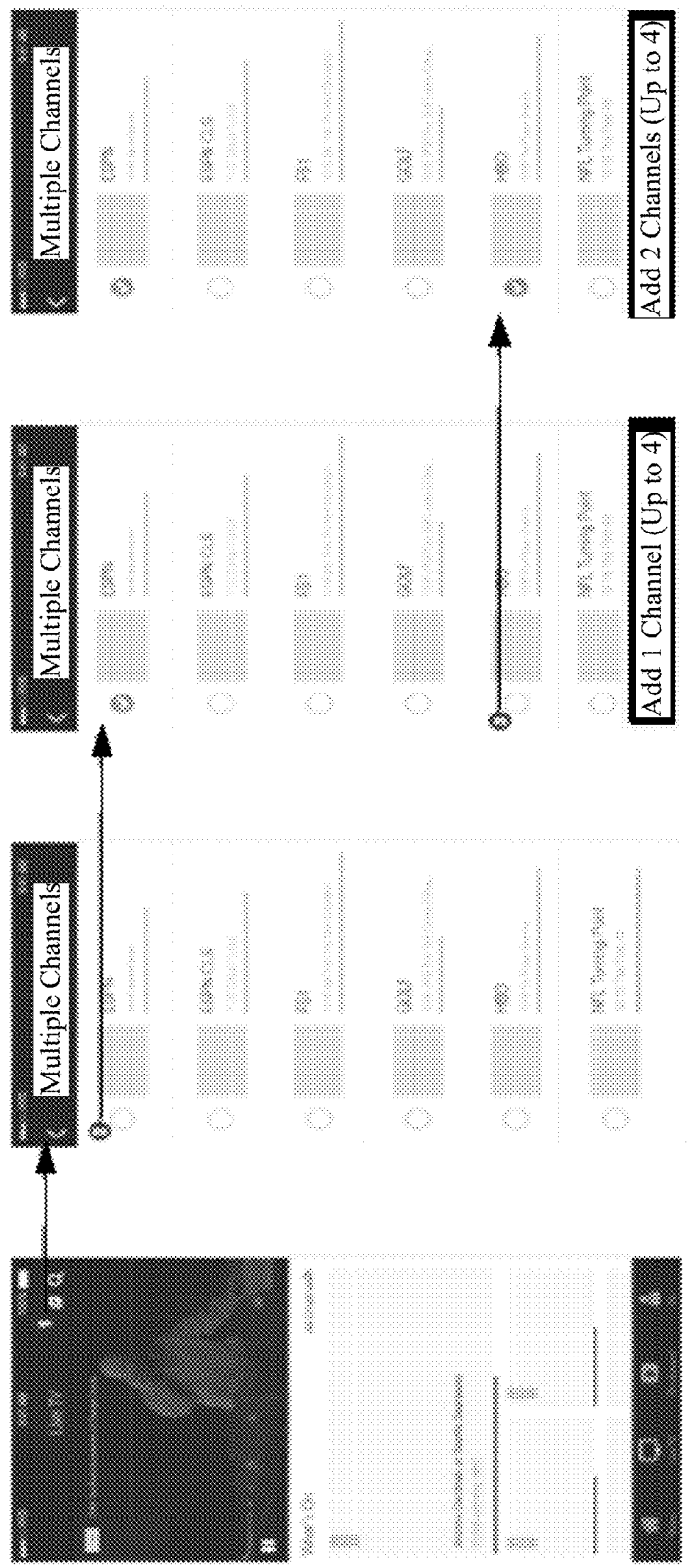
FIG. 4 is a schematic flowchart of a video playing method according to another embodiment of this application.

The user starts a video playing application when needing to watch a video, and a display interface of the video playing application is shown in FIG. 2(a), FIG. 2(b), and FIG. 2(c), including an icon of a multi-channel simultaneous watching portal. The user clicks the icon of the multi-channel simultaneous watching portal, and after the terminal device receives the click operation of the user on the icon of the multi-channel simultaneous watching portal, a channel selection page is displayed on a screen (as shown in FIG. 3). The channel selection page includes a plurality of video icons (of which a quantity is represented as M, and M≥2), and the plurality of video icons respectively correspond to different channel content. The user clicks video icons corresponding to a plurality of pieces of channel content to be played. In this embodiment, that the user selects two pieces of channel content is used as an example. To prevent the user from selecting same channel content, after the user selects a channel, a button corresponding to the channel cannot be selected again (for example, the button is dimmed and cannot be selected again). In addition, after the user selects the channel, a quantity of selected channels may be further displayed (for example, in a black box shown in FIG. 3). A detailed schematic flowchart may be shown in FIG. 4.

It should be understood that a quantity of video icons that can be selected by the user is a value of M, which may be a quantity greater than or equal to 2. However, in actual application, the user may alternatively set a maximum value of M to 4. This is not limited in this application.

102. Play first channel content in a first video display window and play second channel content in a second video display window based on a display mode selected by the user.

After the terminal device receives an acknowledged operation of the user (to be specific, the user performs a click for acknowledgement of the selected video icons, for example, clicks the black box shown in FIG. 3), the video playing application may start two playing instances. For ease of description, in this embodiment, these two playing instances are respectively referred to as a first playing instance and a second playing instance. The first playing instance corresponds to the first video display window and plays the first channel content. The second playing instance corresponds to the second video display window and plays the second channel content.

It should be understood that location sequences of the first video display window and the second video display window may be arranged based on a sequence selected by the user, or may be arranged based on a sequence of the video icons. This is not limited in this application.

It may be further understood that sizes of the first video display window and the second video display window may be completely the same, partially the same, or completely different. This is not limited in this application.

Optionally, the terminal device may further receive a selection operation of the user on a multi-channel watching mode icon displayed on a screen of the terminal device, and determine display modes of the first video display window and the second video display window based on the selection operation of the user. The display mode of the video display window may be displaying all video display windows side by side, displaying video display windows in a partially covered manner, or the like.

Figure 5A:
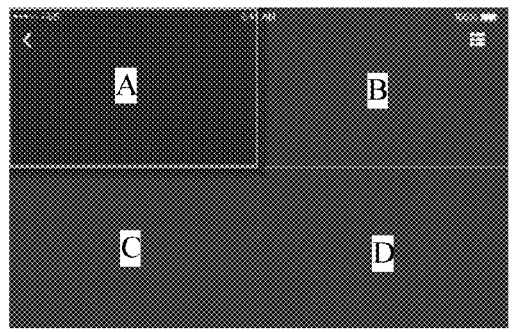
FIG. 5(a) and FIG. 5(b) are schematic diagrams of video playing screen display according to an embodiment of this application.
Figure 5B:
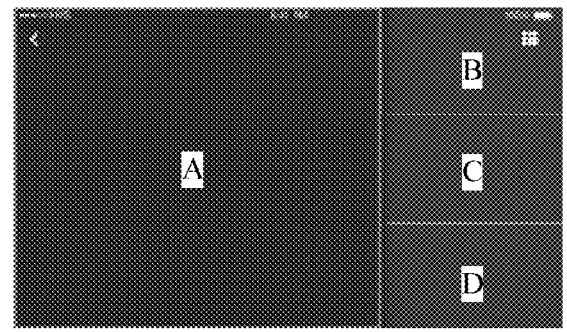

Specifically, a multi-channel watching mode may include a plurality of modes, and the modes may be distinguished by numeral labels. When the user clicks a numeral label, a display mode of a video display window corresponding to the numeral label is selected. For example, a number 1 corresponds to displaying video display windows side by side, where sizes of all video display windows are the same (which may be expressed as an equal (equal) state in a PoP mode, as shown in FIG. 5(*a*)), a number 2 corresponds to displaying video display windows side by side, where sizes of all video display windows are partially the same (which may be expressed as an unequal (unequal) state in the PoP mode, as shown in FIG. 5(*b*)), a number 3 corresponds to displaying video display windows in a partially covered manner, where a biggest video display window has a same size as a display screen, other video display windows suspend over the biggest video display window, and sizes of the other video display windows are the same and far smaller than a size of the biggest video display window, a number 4 corresponds to displaying video display windows in a partially covered manner, where a biggest video display window has a same size as a display screen, and sizes of other video display windows are different and all far smaller than a size of the biggest video display window, and a number 5 corresponds to displaying video display windows in a partially covered manner, where sizes of all video display windows are the same, but there may be a video display window suspending over another video display window. In this embodiment of this application, the video display windows may alternatively be displayed in another combined mode, which is not limited in this application.

Optionally, the display mode of the video display window may alternatively include only two display modes: a Picture out Picture (PoP) mode and a Picture in Picture (PiP) mode. In the PoP mode, a primary video display window and a secondary video display window are displayed side by side, and the secondary video display window may have a plurality of sizes. In the PiP mode, the secondary video display window suspends over the primary video display window, and the secondary video display window has only one size.

It should be understood that the primary video display window herein may be a video display window occupying a largest area of the display screen of the terminal device in the video display windows, and usually, there is only one primary video display window. All other video display windows different from the primary video display window may be referred to as secondary video display windows.

It should be noted that this embodiment of this application may be applied to a scenario in which the multi-channel watching mode is directly selected after the user performs an operation on the channel selection page. To be specific, the user selects the display mode of the video display window before a video is played.

103. The terminal device detects an operation gesture of the user on the first video display window or the second video display window.

When the terminal device simultaneously plays the first channel content and the second channel content on the display screen based on the selection of the user, the terminal device may further receive a display mode operation of the user on the primary video display window or the secondary video display window. The display mode operation may be an operation of the user on the display screen of the terminal device, a side button of the terminal device, or another component of the terminal device, or an operation that is of the user and that is obtained by shaking a mobile phone or by using a gravity sensor, or the like. The terminal device adjusts playing of the first channel content and the second channel content based on an operation type of the user and the current display mode after receiving the display mode operation.

Figure 6:
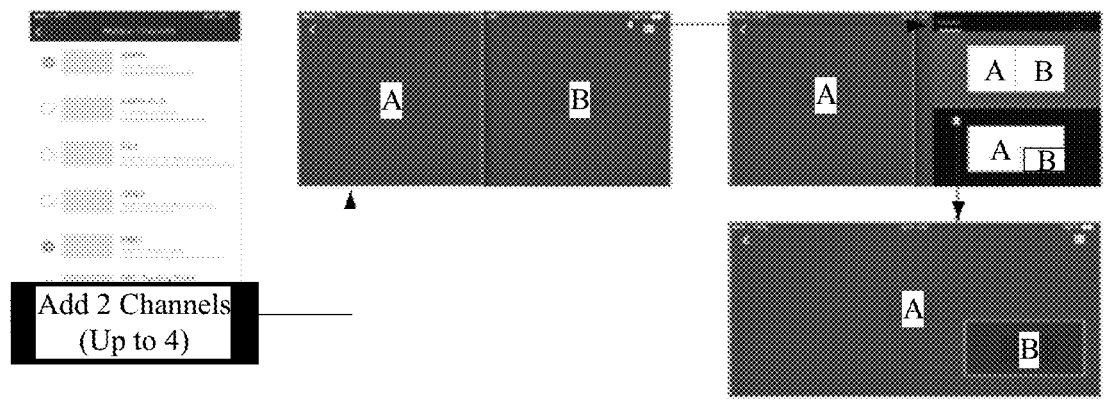
FIG. 6 is a schematic flowchart of a video playing method according to another embodiment of this application.

Optionally, the display mode operation on the primary video display window or the secondary video display window may be an operation of the user on the multi-channel watching mode icon displayed on the screen of the terminal device, so that the terminal device may switch a display mode for video playing during video playing, as shown in FIG. 6.

Certainly, the terminal device may alternatively set a default display mode to play the channel content, and perform switching from the current default display mode to a selected display mode through the operation of the user on the multi-channel watching mode icon.

Optionally, a first user operation may be clicking, dragging, or moving the display screen by the user. This is not limited in this application.

104. The terminal device adjusts playing modes of the first channel content and the second channel content based on the operation gesture of the user and the current display mode.

After the terminal device plays the corresponding first channel content and the corresponding second channel content respectively in the first video display window and the second video display window on the screen, the terminal device may further adjust the playing modes of the first channel content and the second channel content based on the received display mode operation on the primary video display window or the secondary video display window. Compared with the prior art in which once a video product is played, a size of a window displaying channel content is fixed, and other playing modes for video playing cannot be changed either, this embodiment of this application improves operability of the terminal device, and diversifies video watching modes, thereby improving user experience.

Optionally, when the plurality of video display windows on the display screen of the terminal device are displayed side by side, the PoP mode is used as an example below for description. The terminal device detects user gestures on all video display windows. When the terminal device detects a short tap gesture (that is, a click) of the user, and a click location is within a coverage area of the second video display window in the plurality of video display windows, voice and a picture of the second channel content are played, and only a picture of the first channel content is played. To be specific, when the user clicks the second video display window, the terminal device plays only the sound of the second channel content in the second video display window.

It should be noted that the first channel content and the second channel content are respectively channel content displayed in the first video display window and channel content displayed in the second video display window before the user performs an operation on the first video display window. The first video display window herein is any one of the plurality of video display windows except the second video display window.

Figure 7:
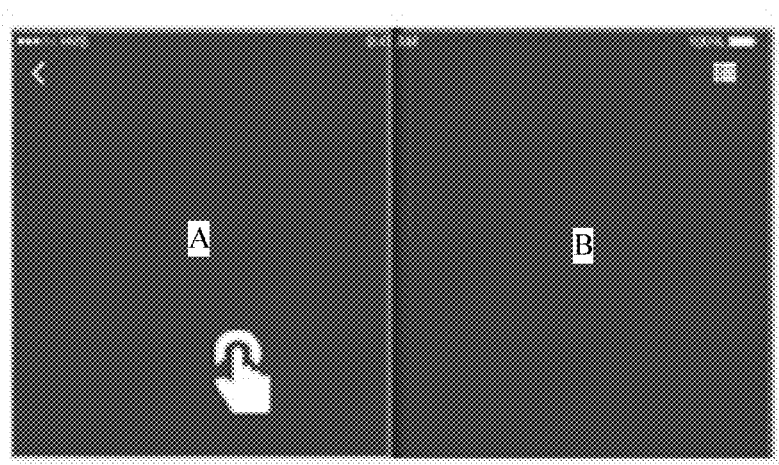
FIG. 7 is a schematic flowchart of a video playing method according to another embodiment of this application.

It should be understood that this embodiment of this application may be further applied to a scenario in which a picture of the first channel content is currently played in the second video display window, and a picture and voice of the first channel content are played in the first video display window. When the coverage area of the second video display window is clicked, the terminal device switches voice playing from the voice of the first channel content to voice of the second channel content. For example, as shown in FIG. 7, a video A including a picture A is played in the second video display window, and a video B including a picture B and voice B is played in the first video display window. If the user clicks the coverage area of the second video display window, the picture A and voice A are played in the second video display window, and the picture B is played in the first video display window.

It should be further understood that this embodiment of this application may be further applied to a scenario in which voice can be repeatedly switched. This is not limited in this application.

Optionally, in the PoP mode, the first user operation may further include holding down and dragging the second video display window towards the first video display window. After detecting a hold down gesture of the user on the second video display window, the terminal device activates the second video display window. If the terminal device detects that the user moves a finger after performing a hold down operation, the terminal device detects a drag gesture, and moves the second video display window a same distance with the finger. After detecting that the hold down or drag gesture disappears, the terminal device needs to determine whether a center point of the second video display window is moved to a coverage area of the first video display window.

Figure 8:
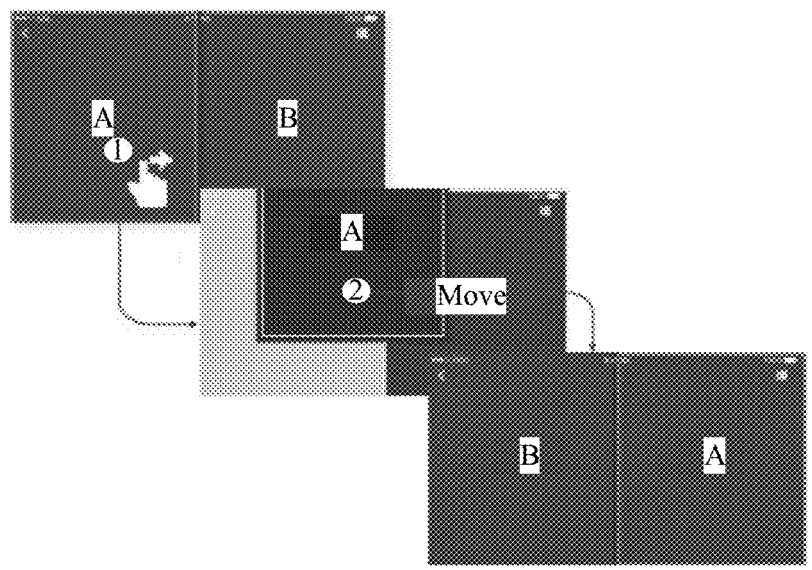
FIG. 8 is a schematic diagram of a video playing method according to another embodiment of this application.

If the center point of the second video display window is moved to the coverage area of the first video display window, playing locations of the first channel content and the second channel content are exchanged. To be specific, the first channel content is played in the second video display window, and the second channel content is played in the first video display window. If the center point of the second video display window is not moved out of the coverage area of the second video display window, the second video display window is restored to an original location, as shown in FIG. 8.

It should be noted that, to detect the hold down and drag gestures of the user, the terminal device may first activate the second video display window and then monitor the drag gesture of the user after detecting the hold down gesture of the user on the second video display window, so that the terminal device moves the second video display window with the drag gesture of the user.

Optionally, the terminal device may further determine, depending on whether the center point of the second video display window is moved out of the original coverage area of the second video display window, whether to restore the second video display window to the original location or exchange the first channel content and the second channel content.

It should be understood that, in this embodiment of this application, the coverage area of the second video display window may be referred to as a "photo frame" of the second video display window. To be specific, when the second video display window moves out of the "photo frame" of the second video display window, the first channel content and the second channel content are exchanged, and when the second video display window does not move out of the "photo frame" of the second video display window, the second video display window is restored to the original location.

Optionally, in the PoP mode, the first user operation includes a scaling operation on the first video display window. Specifically, the user may perform the scaling operation by using a pinch gesture. The terminal device determines a scaling multiple of the first video display window based on the detected pinch gesture of the user, and adjusts a size of the first video display window based on the scaling multiple, so as to play the first channel content in the adjusted first video display window.

It should be understood that because all the video display windows are displayed on the display screen side by side in the PoP mode, the terminal device may also change a size of another video display window when scaling up or scaling down the first video display window based on the operation of the user on the first video display window. This is not limited in this application.

Figure 9:
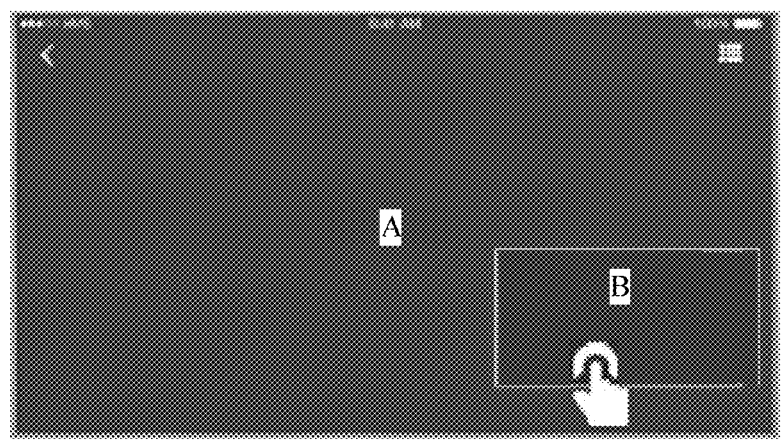
FIG. 9 is a schematic diagram of a video playing method according to another embodiment of this application.

Optionally, when the plurality of video display windows on the display screen of the terminal device are displayed in a partially covered manner, the PiP mode is used as an example below for description. For example, the first video display window is a video display window occupying a largest display screen area of the terminal device (for example, the first video display window is displayed in full screen), and the second video display window at least partially suspends over the first video display window (or completely suspends over the first video display window). The first channel content is played in the first video display window, and the second channel content is played in the second video display window. The terminal device detects user gestures on all the video display windows. If the terminal device detects a short tap gesture of the user (represented as a user click operation) at a third location, and the third location belongs to the coverage area of the first video display window, the terminal device exchanges playing locations of the first channel content and the second channel content. To be specific, the first channel content is played in the second video display window, and the second channel content is played in the first video display window, as shown in FIG. 9.

Optionally, in the PiP mode, the terminal device may detect only a user operation on the secondary video display window, thereby reducing power consumption of the terminal device.

Figure 10:
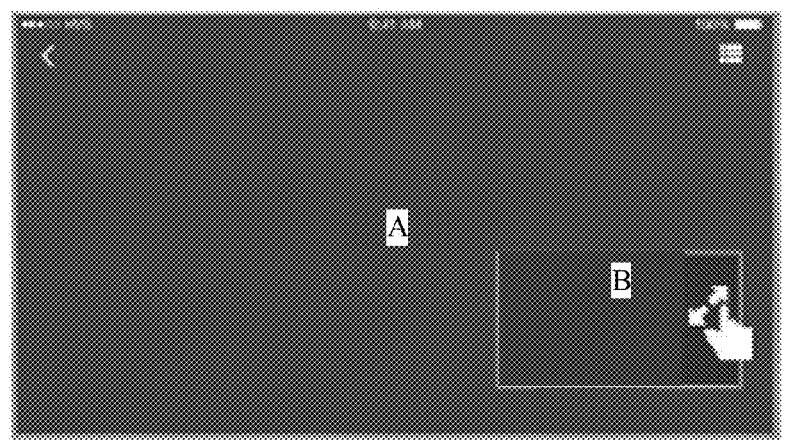
FIG. 10 is a schematic diagram of a video playing method according to another embodiment of this application.

Optionally, in the PiP mode, the operation gesture of the user includes holding down and dragging the second video display window from a second location to a first location. The terminal device detects a drag gesture, and moves the second video display window along with a distance that a finger moves. To be specific, the distance that the finger moves is the same as a distance that the center point of the second video display window is moved, and the terminal device plays the first channel content in the second video display window that is moved to the first location, as shown in FIG. 10.

It should be noted that, to detect the drag gesture of the user on the second video display window, the terminal device may first activate the second video display window after detecting a hold down operation of the user on the second video display window, and then moves the second video display window a corresponding or same distance with the drag gesture after detecting the drag gesture of the user on the second video display window.

It should be understood that the moving the second video display window the corresponding distance with the drag gesture means that the terminal device may set a correspondence between a moving distance of the finger and a moving distance of the second video display window in advance, so that the terminal device may determine, based on the correspondence, a distance that the second video display window should move and corresponds to the distance that the finger moves.

Figure 11:
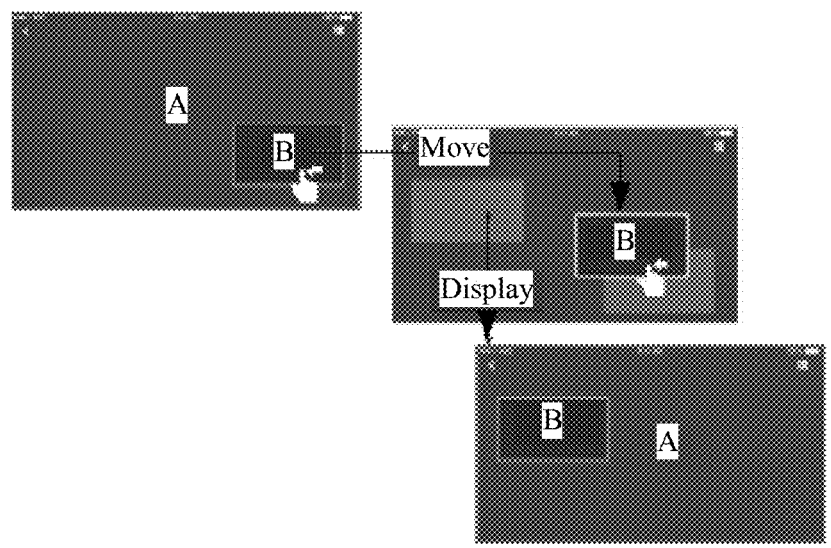
FIG. 11 is a schematic diagram of a video playing method according to another embodiment of this application.

Optionally, in the PiP mode, the operation gesture of the user includes a scaling operation on the first video display window. Specifically, the user may perform the scaling operation by using a pinch gesture. The terminal device determines a scaling multiple of the second video display window based on the detected pinch gesture of the user, and adjusts a size of the second video display window based on the scaling multiple, so as to play the second channel content in the adjusted second video display window, as shown in FIG. 11.

It should be understood that the pinch gesture of the user on the second video display window may be implemented by two fingers. An increasing distance between the two fingers corresponds to scaling up the second video display window, and a decreasing distance between the two fingers corresponds to scaling down the second video display window.

Therefore, according to the video playing method in this embodiment of this application, the terminal device starts the at least two playing instances based on the operation instruction of the user, plays the first channel content in the first video display window and plays the second channel content in the second video display window based on the display mode selected by the user, detects the operation gesture of the user on the first video display window or the second video display window, and adjusts the playing modes of the first channel content and the second channel content based on the operation gesture of the user and the current display mode. In this way, the terminal device may further adjust playing of the channel content based on the detected operation gesture after playing the channel content. Compared with the prior art in which once a video product is played, a size of a window displaying channel content is fixed, and a playing mode is fixed, this embodiment of this application improves operability of the terminal device, and diversifies video watching modes, thereby improving user experience.

Figure 12A:
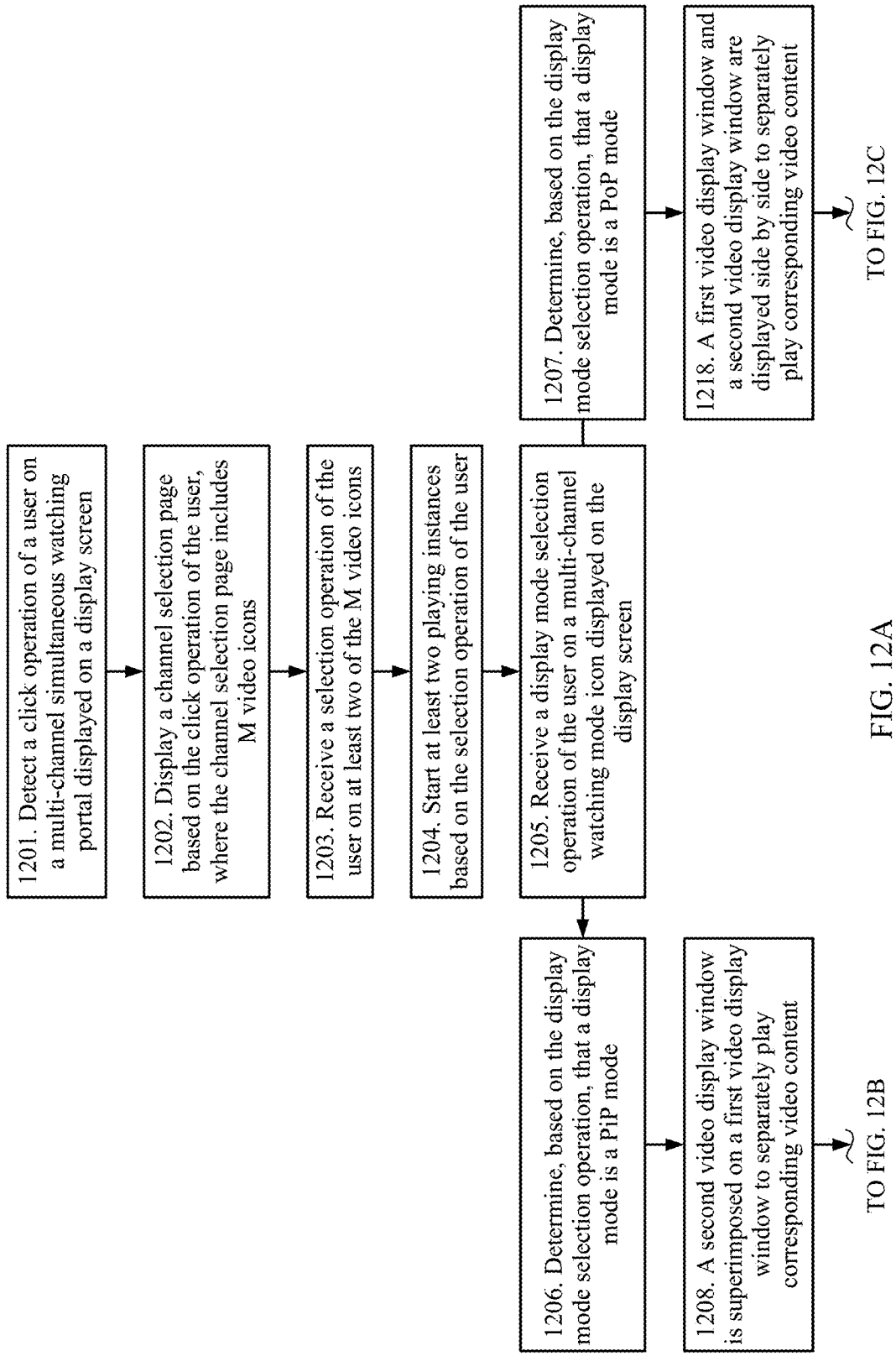
FIG. 12A, FIG. 12B, and FIG. 12C are a schematic flowchart of a video playing method according to another embodiment of this application.
Figure 12B:
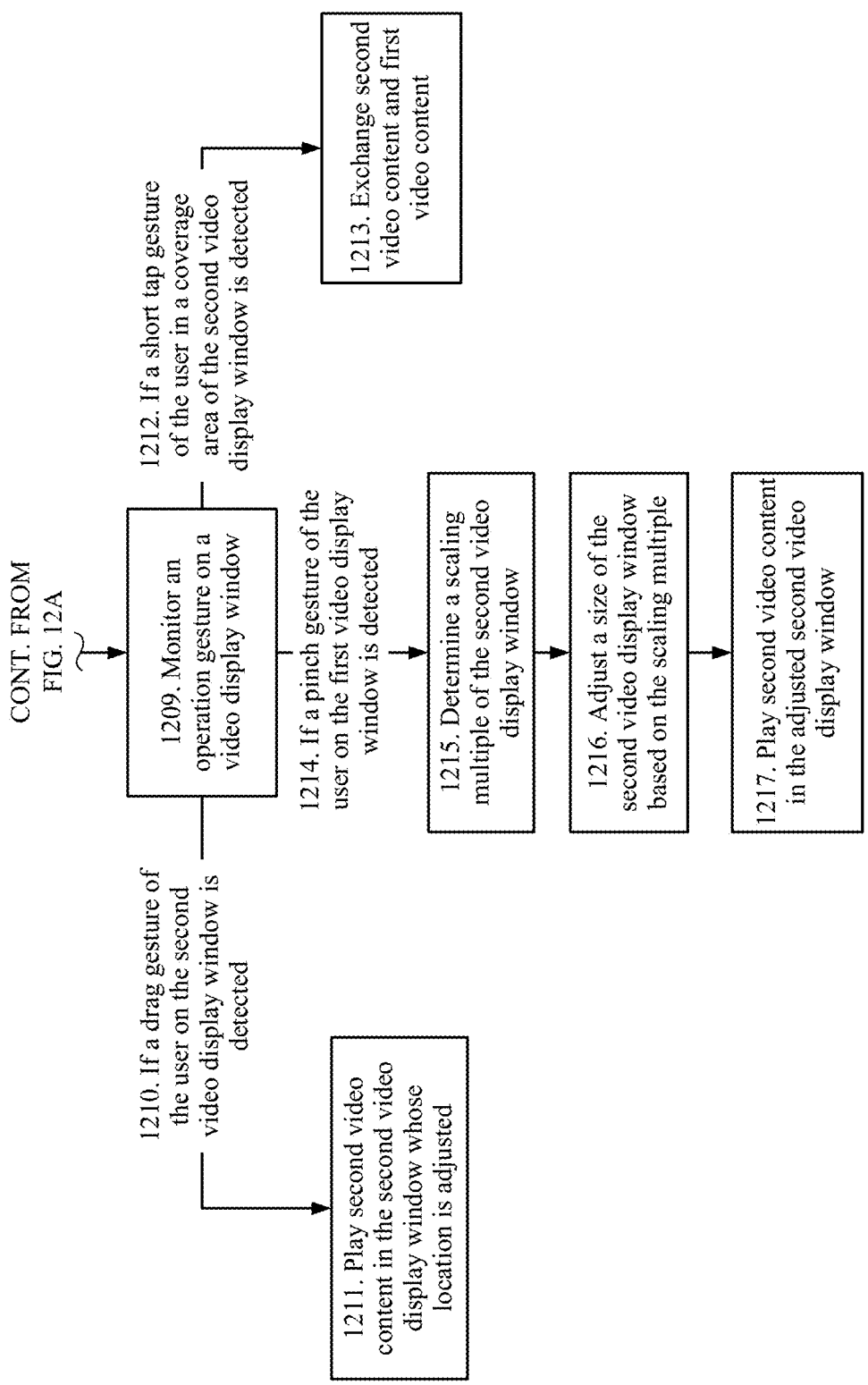
Figure 12C:
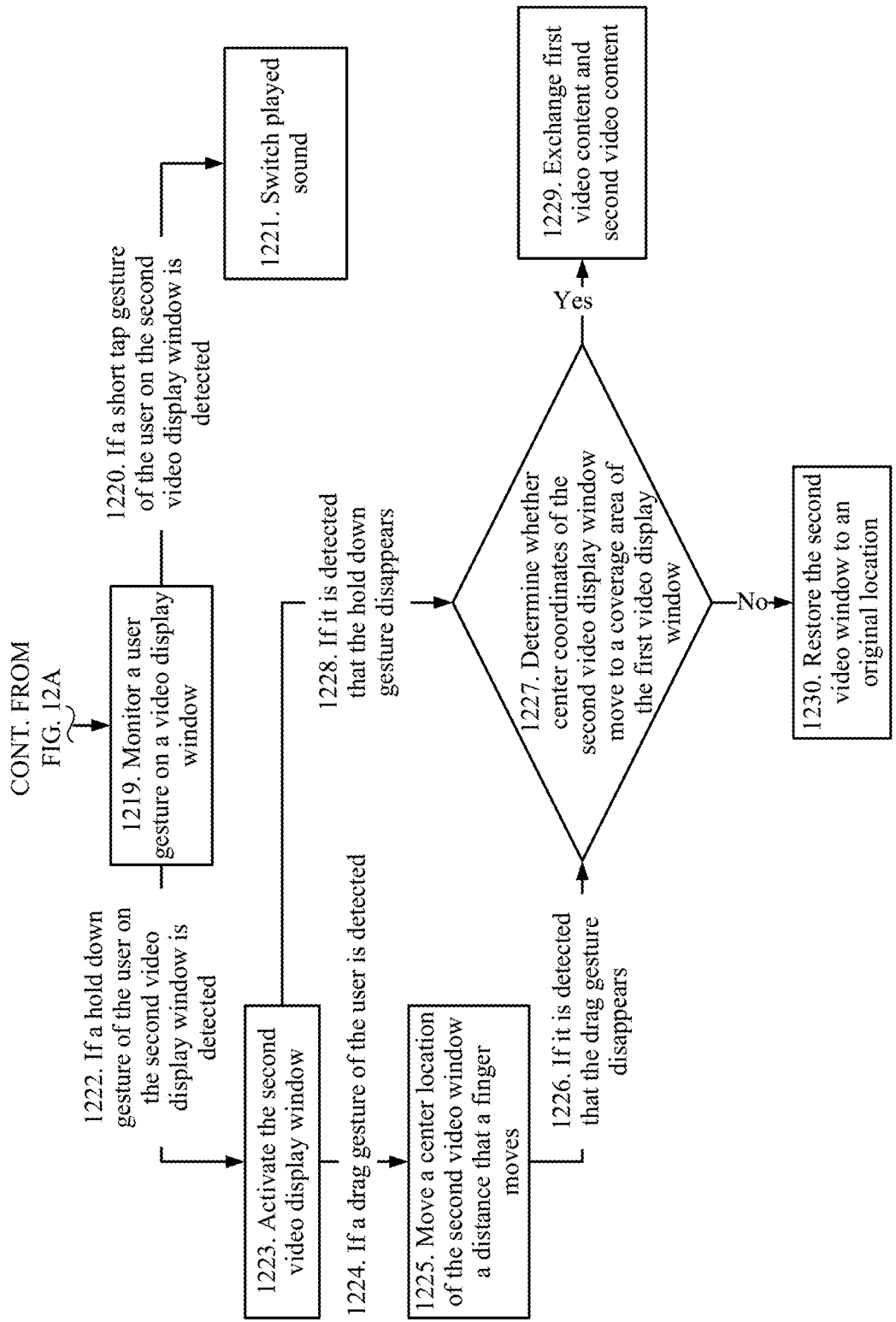

FIG. 12A, FIG. 12B, and FIG. 12C are a flowchart of a video playing method according to an embodiment of this application. Meanings of various terms in this embodiment are the same as those in the foregoing embodiments.

1201. A terminal device receives a click operation of a user on a multi-channel simultaneous watching portal displayed on a display screen of the terminal device.

1202. The terminal device displays a channel selection page based on the click operation, where the channel selection page includes M video icons, the M video icons are in a one-to-one correspondence with M pieces of channel content, and M is a positive integer greater than or equal to 2.

1203. The terminal device receives a selection operation of the user on at least two of the M video icons.

1204. The terminal device determines, based on the selection operation, that a quantity of video display windows displayed on the display screen is a quantity of the selected video icons, that is, at least two video display windows are displayed on the display screen.

1205. The terminal device receives a selection operation of the user on a multi-channel simultaneous watching mode icon displayed on the display screen.

1206. If the operation of the user on the multi-channel simultaneous watching mode icon is selecting a PiP mode, and that the user selects two video display windows for simultaneous watching is used as an example, the two display windows are at least partially displayed in a superimposed manner. For example, a second video display window is superimposed on a first video display window.

1207. If the operation of the user on the multi-channel simultaneous watching mode icon is selecting a PoP mode, and that the user selects two video display windows for simultaneous watching is used as an example, the first video display window and the second video display window are displayed side by side.

1208. The terminal device uses a display mode in which the second video display window is superimposed on the first video display window to play second channel content in the second video display window and play first channel content in the first video display window.

1209. The terminal device monitors user gestures on the two video display windows during channel content playing, or may monitor only a gesture on the second video display window.

1210. The terminal device determines, through monitoring, that the user holds down and drags the second video display window from a second location to a first location.

1211. The terminal device plays the second channel content in the second video display window that is moved to the first location.

1212. The terminal device determines, through monitoring, that the user performs a short tap gesture operation at a coverage area of the second video display window, and the first video display window is a video display window that occupies a largest display screen area of the terminal device.

1213. The terminal device exchanges playing locations of the first channel content and the second channel content, to be specific, the first channel content is played in the second video display window, and the second channel content is played in the first video display window.

1214. The terminal device determines, through monitoring, that the user performs a pinch gesture operation on the second video display window.

1215. The terminal device determines a scaling multiple of the second video display window based on the pinch gesture operation.

1216. The terminal device adjusts a size of the second video display window based on the scaling multiple.

1217. Play the second channel content in the adjusted second video display window.

1218. A display mode in which the first video display window and the second video display window are displayed side by side is used to play the first channel content in the first video display window and play the second channel content in the second video display window.

1219. The terminal device monitors user gestures on the first video display window and the second video display window.

1220. The terminal device determines, through monitoring, that the user performs a short tap gesture operation in the coverage area of the second video display window.

1221. The terminal device plays sound and a picture of the second video display window. If the terminal device plays sound of videos on N video display windows before the user performs the operation, sound played by the terminal device includes only sound of a second video corresponding to the second video display window after the user performs the short tap gesture operation on the second video display window. If the sound played by the terminal device is sound of a first video corresponding to the first video display window before the user performs the operation, the sound played by the terminal device is switched from the sound of the first video to the sound of the second video after the user performs the short tap gesture operation on the second video display window.

1222. The terminal device determines, through monitoring, that the user performs a hold down gesture operation on the second video display window.

1223. The terminal device activates the second video display window.

1224. The terminal device detects a drag gesture of the user on the second video display window.

1225. The terminal device moves the second video display window a corresponding distance with the drag gesture of the user.

1226. The terminal device detects that the drag gesture disappears.

1227. If the terminal device drags the second video display window towards the first video display window, the terminal device determines whether a center point of the second video display window is moved to a coverage area of the first video display window.

1228. After activating the second video display window and detecting that the hold down gesture disappears, the terminal device may alternatively directly perform step 1227.

1229. If the terminal device determines that the center point of the second video display window is moved to the coverage area of the first video display window, the terminal device exchanges playing locations of the first channel content and the second channel content. To be specific, the first channel content is played in the second video display window, and the second channel content is played in the first video display window.

1230. If the terminal device determines that the center point of the second video display window is not moved to the coverage area of the first video display window, the terminal device restores the second video display window to an original location.

Therefore, according to the video playing method in this embodiment of this application, the terminal device starts the at least two playing instances based on the operation instruction of the user, plays the first channel content in the first video display window and plays the second channel content in the second video display window based on the display mode selected by the user, detects the operation gesture of the user on the first video display window or the second video display window, and adjusts the playing modes of the first channel content and the second channel content based on the operation gesture of the user and the current display mode. In this way, the terminal device may further adjust playing of the channel content based on the detected operation gesture after playing the channel content. Compared with the prior art in which once a video product is played, a size of a window displaying channel content is fixed, and a playing mode is fixed, this embodiment of this application improves operability of the terminal device, and diversifies video watching modes, thereby improving user experience.

The foregoing has described the video playing methods according to the embodiments of this application in detail. The following describes a terminal device according to an embodiment of this application.

Figure 13:
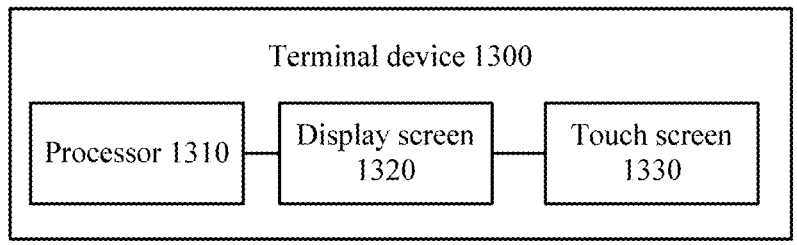
FIG. 13 is a schematic diagram of a terminal device according to an embodiment of this application.

FIG. 13 is a schematic block diagram of a terminal device 1300 according to an embodiment of this application. As shown in FIG. 13, the terminal device 1300 includes a processor 1310, configured to start at least two playing instances based on an operation instruction of a user, where each of the at least two playing instances corresponds to a video display window, and the video display window includes a first video display window and a second video display window, a display screen 1320, configured to play first channel content in the first video display window and play second channel content in the second video display window based on a display mode selected by the user, and a touchscreen 1330, further configured to detect an operation gesture of the user on the first video display window or the second video display window.

The processor 1310 is further configured to adjust playing modes of the first channel content and the second channel content based on the operation gesture of the user and the current display mode.

Optionally, the starting at least two playing instances based on an operation instruction of a user includes the touchscreen 1330 is configured to detect a click operation of the user on a multi-channel simultaneous watching portal displayed on a display screen of the terminal device, and the processor 1310 is further configured to display a channel selection page based on the click operation of the user, where the channel selection page includes M video icons corresponding to M pieces of channel content, M is a positive integer, and M≥2, and the touchscreen 1330 is configured to receive a selection operation of the user on at least two of the M video icons, and the processor 1310 is configured to start at least two playing instances based on the selection operation of the user.

Optionally, the display mode selected by the user includes a Picture in Picture PiP mode and a Picture out Picture PoP mode. The display screen 1320 is specifically configured to if the display mode selected by the user is the PiP mode, determine the first video display window as a primary display window, determine the second video display window as a secondary display window, and superimpose the second video display window on the first video display window.

Optionally, the display screen 1320 is specifically configured to if the display mode selected by the user is the PoP mode, display the first video display window and the second video display window side by side.

Optionally, the operation gesture that is of the user and that is detected by the touchscreen 1330 includes a scaling operation on the second video display window. The processor 1310 is specifically configured to determine a scaling multiple of the second video display window, adjust a size of the second video display window based on the scaling multiple, and play the second channel content in the adjusted second video display window.

Optionally, the operation gesture that is of the user and that is detected by the touchscreen 1330 includes holding down and dragging the second video display window from a second location to a first location. The processor 1310 is specifically configured to display the second video display window at the first location, and play the second channel content in the second video display window whose location is adjusted.

Optionally, the operation gesture that is of the user and that is detected by the touchscreen 1330 includes a click operation on the second video display window. The processor 1310 is specifically configured to play the second channel content in the first video display window, and play the first channel content in the second video display window.

Optionally, the operation gesture that is of the user and that is detected by the touchscreen 1330 includes a click operation on the second video display window. The processor 1310 is specifically configured to play sound of the second channel content, and turn off sound of the first channel content.

Optionally, the operation gesture that is of the user and that is detected by the touchscreen 1330 includes holding down and dragging the second video display window from a second location to a first location. The processor 1310 is specifically configured to determine whether a center point of the second video display window is moved to a coverage area of the first video display window, and if the center point of the second video display window is moved to the coverage area of the first video display window, play the first channel content in the second video display window, and play the second channel content in the first video display window.

Therefore, the terminal device in this embodiment of this application starts the at least two playing instances based on the operation instruction of the user, plays the first channel content in the first video display window and plays the second channel content in the second video display window based on the display mode selected by the user, detects the operation gesture of the user on the first video display window or the second video display window, and adjusts the playing modes of the first channel content and the second channel content based on the operation gesture of the user and the current display mode. In this way, the terminal device may further adjust playing of the channel content based on the detected operation gesture after playing the channel content. Compared with the prior art in which once a video product is played, a size of a window displaying channel content is fixed, and a playing mode is fixed, this embodiment of this application improves operability of the terminal device, and diversifies video watching modes, thereby improving user experience.

The terminal device according to this embodiment of this application may correspond to the terminal device in the video playing methods in the embodiments of this application, and the foregoing and other operations and/or functions of the modules in the terminal device are respectively intended to implement corresponding procedures of the methods. For brevity, details are not described herein again.

Figure 14A:
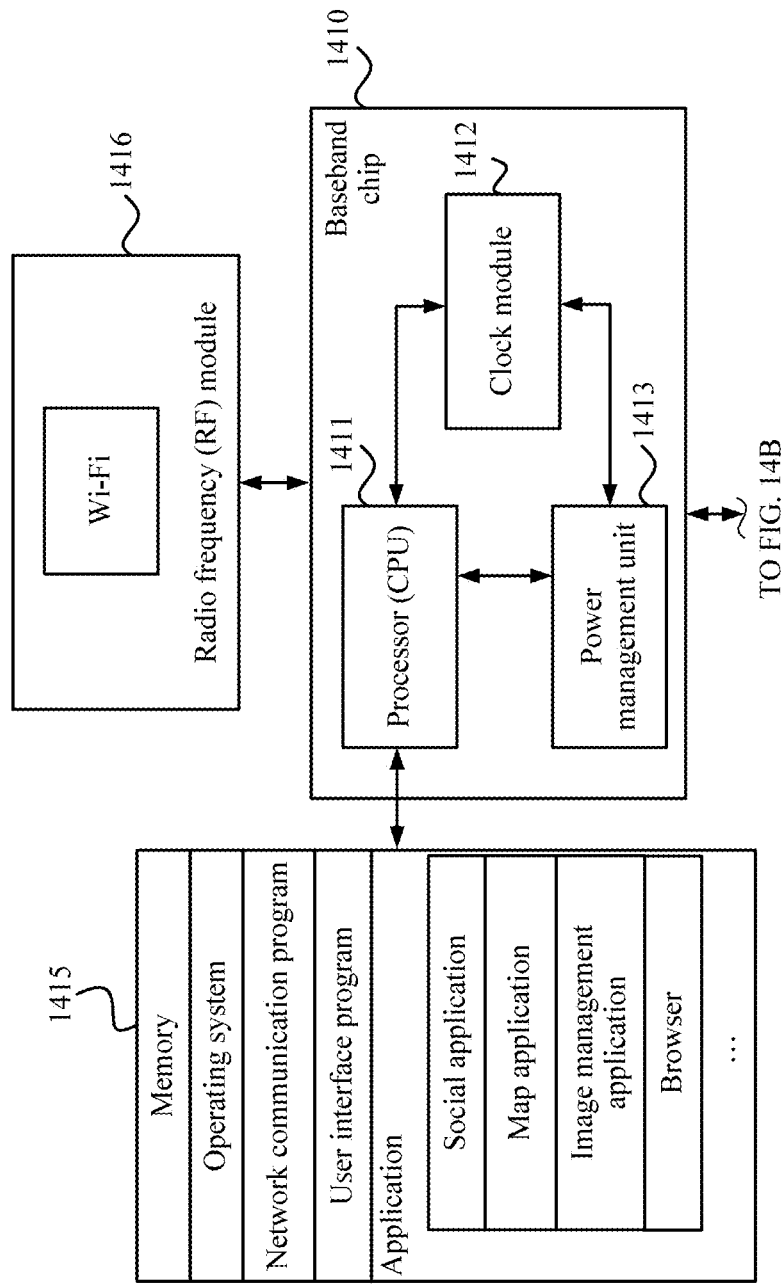
FIG. 14A and FIG. 14B are a schematic structural diagram of a terminal device according to an embodiment of this application.
Figure 14B:
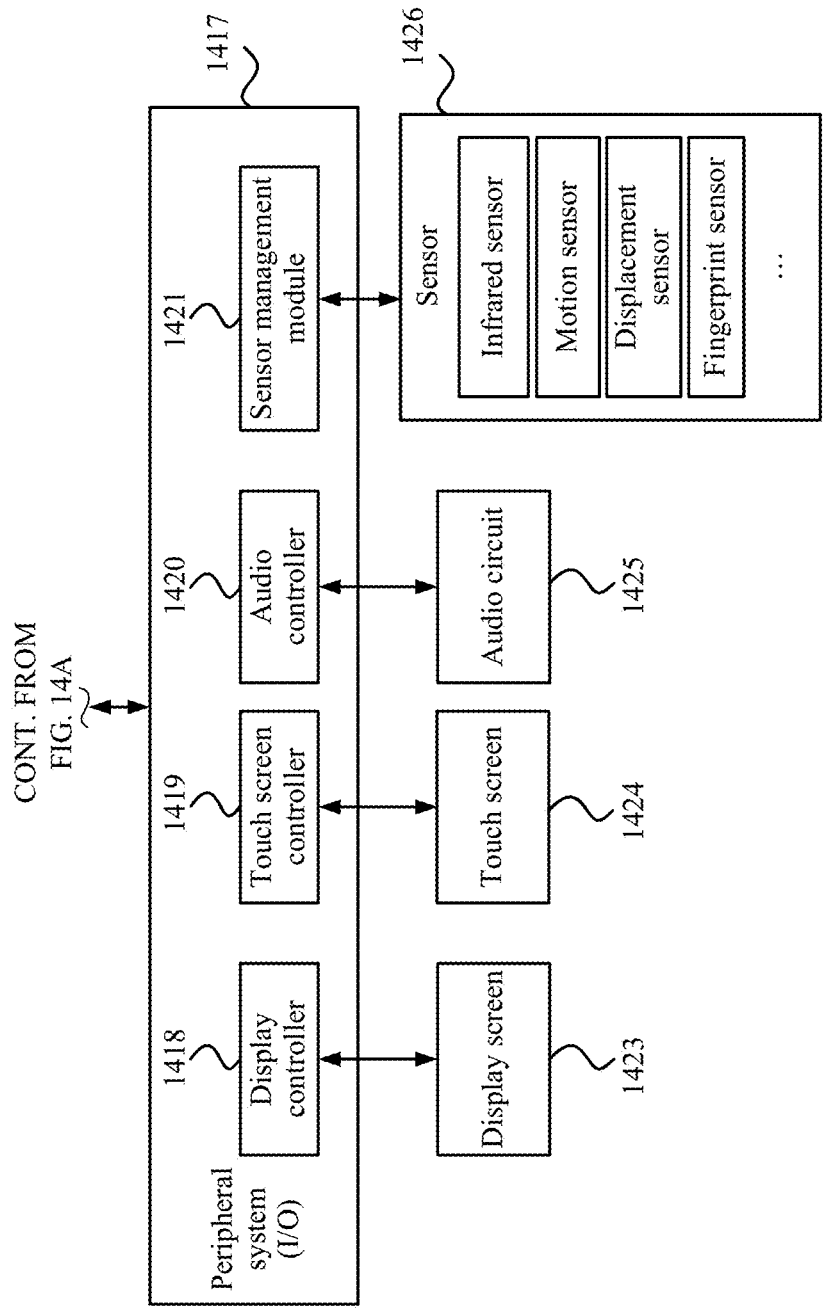

FIG. 14A and FIG. 14B are a schematic structural diagram of a terminal device according to another embodiment of this application. As shown in FIG. 14A and FIG. 14B, the terminal device may include a baseband chip 1410, a memory 1415 (one or more computer-readable storage media), a radio frequency (RF) module 1416, and a peripheral system 1417. The peripheral system 1417 is mainly configured to implement a function of interaction between the terminal and a user/an external environment, and mainly includes an input/output apparatus of the terminal device. In specific implementation, the peripheral system 1417 may include a display controller 1418, an audio controller 1420, and a sensor management module 1421. The controllers may be coupled to respective corresponding peripheral devices (such as a display screen 1423, an audio circuit 1425, and a sensor 1426). It should be noted that the peripheral system 1417 may further include another input/output (Input/Output, I/O) peripheral device.

The baseband chip 1410 may include one or more processors 1411, a clock module 1412, and/or a power management unit 1413 through integration. The clock module 1412 integrated into the baseband chip 1410 is mainly configured to generate a clock required for data transmission and time sequence control for the processor 1411. The power management unit 1413 integrated into the baseband chip 1410 is mainly configured to provide a stable and high-precision voltage for the processor 1411, the radio frequency module 1416, and the peripheral system.

The display screen 1320 in the embodiment shown in FIG. 13 may be implemented by the display screen 1423, and the processor 1310 in the embodiment shown in FIG. 13 may be implemented by the processor 1411.

The radio frequency (RF) module 1416 is configured to receive and send a radio frequency signal, and mainly integrates a receiver and a transmitter of the terminal device. The radio frequency (RF) module 1416 communicates with a communications network and another communications device by using the radio frequency signal. In specific implementation, the radio frequency (RF) module 1416 may include but is not limited to an antenna system, a radio network module, a Wireless Fidelity (Wireless Fidelity, Wi-Fi) module, RF transceiver, one or more amplifiers, a tuner, one or more oscillators, a digital signal processor, a codec (CODEC) chip, and/or a storage medium. In some embodiments, the radio frequency (RF) module 1416 may be implemented on a separate chip.

The memory 1415 is coupled to the processor 1411, and is configured to store various software programs and/or a plurality of sets of instructions. In specific implementation, the memory 1415 may include a high-speed random access memory, and may alternatively include a non-volatile memory, for example, one or more disk storage devices, a flash memory device, or another non-volatile solid-state storage device. The memory 1415 may store an operating system (hereinafter referred to as a system), such as an embedded operating system (Android, iOS, Windows, or Linux). The memory 1415 may further store a network communication program, and the network communication program may be used to communicate with one or more additional devices, one or more terminal devices, and one or more network devices. The memory 1415 may further store a user interface program, and the user interface program may vividly display content of an application by using a graphical operation interface, and receive a control operation of a user on the application by using input controls such as a menu, a dialog box, and a key.

The memory 1415 may further store one or more applications. As shown in FIG. 14A and FIG. 14B, these applications may include a social application (such as Facebook), an image management application (such as an album), a map application (such as Google Map), a browser (such as Safari or Google Chrome), and the like.

It should be understood that the terminal device is merely an example provided in this embodiment of this application, and the terminal device may have more or fewer components than the shown components, may combine two or more components, or may have different component configurations.

In some implementations, the processor 1411 is configured to start at least two playing instances based on an operation instruction of a user, where each of the at least two playing instances corresponds to a video display window, and the video display window includes a first video display window and a second video display window.

The display screen 1423 is configured to play first channel content in the first video display window and play second channel content in the second video display window based on a display mode selected by the user.

The processor 1411 is further configured to detect an operation gesture of the user on the first video display window or the second video display window.

The processor 1411 is further configured to adjust playing modes of the first channel content and the second channel content based on the operation gesture of the user and the current display mode.

It should be noted that the terminal device may be specifically the terminal device in the embodiment shown in FIG. 1, and may perform steps and/or procedures corresponding to the terminal device in the method shown in FIG. 1.

It may be learned from the technical solutions provided in the embodiments of this application that the terminal device starts the at least two playing instances based on the operation instruction of the user, plays the first channel content in the first video display window and plays the second channel content in the second video display window based on the display mode selected by the user, detects the operation gesture of the user on the first video display window or the second video display window, and adjusts the playing modes of the first channel content and the second channel content based on the operation gesture of the user and the current display mode. In this way, the terminal device may further adjust playing of the channel content based on the detected operation gesture after playing the channel content. Compared with the prior art in which once a video product is played, a size of a window displaying channel content is fixed, and a playing mode is fixed, the embodiments of this application improve operability of the terminal device, and diversify video watching modes, thereby improving user experience.

An embodiment of this application further provides a computer storage medium, and the computer storage medium may store a program instruction for indicating any one of the foregoing methods.

Optionally, the storage medium may be specifically the memory 1415.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   starting, by a terminal device, at least two playing instances based on a first operation instruction of a user;
   playing first channel content in a first video display window and playing second channel content in a second video display window according to a display mode selected by the user, wherein the first channel content corresponds to a first playing instance of the at least two playing instances, and the second channel content corresponds to a second playing instance of the at least two playing instances;
   detecting a second operation gesture of the user on the first video display window or the second video display window; and
   adjusting a playing mode of the first channel content or the second channel content according to the second operation gesture of the user and the display mode selected by the user;
   wherein the second operation gesture of the user comprises a click operation on the second video display window, and wherein adjusting the playing mode of the first channel content or the second channel content according to the second operation gesture of the user and the display mode selected by the user comprises playing audio of the second channel content, and turning off audio of the first channel content.

2. The method according to claim 1, wherein starting the at least two playing instances comprises:
  detecting a click operation of the user on a multi-channel simultaneous watching portal displayed on a display screen of the terminal device;
  displaying a channel selection page according to the click operation of the user, wherein the channel selection page comprises M video icons corresponding to M pieces of channel content, M is a positive integer, and M≥2;
  receiving a selection operation of the user on at least two of the M video icons; and
  starting at least two playing instances based on the selection operation of the user.

3. The method according to claim 2, wherein the display mode selected by the user comprises a Picture in Picture (PiP) mode or a Picture out Picture (PoP) mode, and wherein playing the first channel content in the first video display window and playing the second channel content in the second video display window based on the display mode selected by the user comprises:
  in response to the display mode selected by the user being the PiP mode, determining the first video display window to be a primary display window, determining the second video display window to be a secondary display window, and superimposing the second video display window on the first video display window.

4. The method according to claim 3, wherein playing the first channel content in the first video display window and playing the second channel content in the second video display window based on the display mode selected by the user comprises:
  in response to the display mode selected by the user being the PoP mode, displaying the first video display window and the second video display window side-by-side.

5. The method according to claim 4, further comprising detecting a third operation gesture of the user on the first video display window or the second video display window, and adjusting a playing mode of the first channel content or the second channel content according to the third operation gesture of the user and the display mode selected by the user, wherein the third operation gesture of the user comprises holding down and dragging the second video display window from a second location to a first location, and wherein adjusting the playing mode of the first channel content or the second channel content according to the third operation gesture of the user and the display mode selected by the user comprises:
  determining whether a center point of the second video display window is moved to a coverage area of the first video display window; and
  in response to determining that the center point of the second video display window is moved to the coverage area of the first video display window, playing the first channel content in the second video display window, and playing the second channel content in the first video display window.

6. The method according to claim 3, further comprising detecting a third operation gesture of the user on the first video display window or the second video display window, and adjusting a playing mode of the first channel content or the second channel content according to the third operation gesture of the user and the display mode selected by the user, wherein the third operation gesture of the user comprises a scaling operation on the second video display window, and wherein adjusting the playing mode of the first channel content or the second channel content according to the third operation gesture of the user and the display mode selected by the user comprises:
  determining a scaling multiple of the second video display window;
  adjusting a size of the second video display window according to the scaling multiple; and
  playing the second channel content in the adjusted second video display window.

7. The method according to claim 3, further comprising detecting a third operation gesture of the user on the first video display window or the second video display window, and adjusting a playing mode of the first channel content or the second channel content according to the third operation gesture of the user and the display mode selected by the user, wherein the third operation gesture of the user comprises holding down and dragging the second video display window from a second location to a first location, and wherein adjusting the playing mode of the first channel content or the second channel content according to the third operation gesture of the user and the display mode selected by the user comprises:
  displaying the second video display window at the first location, and playing the second channel content in the second video display window whose location is adjusted.

8. The method according to claim 3, further comprising detecting a third operation gesture of the user on the first video display window or the second video display window, and adjusting a playing mode of the first channel content or the second channel content according to the third operation gesture of the user and the display mode selected by the user, wherein the third operation gesture of the user comprises a click operation on the second video display window, and wherein adjusting the playing mode of the first channel content and the second channel content according to the third operation gesture of the user and the display mode selected by the user comprises:
  playing the second channel content in the first video display window, and playing the first channel content in the second video display window.

9. A terminal device, comprising:
  a display screen;
  a touchscreen;
  a processor; and
  a non-transitory computer-readable storage medium storing a program to be executed by the processor, the program including instructions to:
  start at least two playing instances according to a first operation instruction of a user;
  cause the display screen to play first channel content in a first video display window and play second channel content in a second video display window according to a display mode selected by the user, wherein the first channel content corresponds to a first playing instance of the at least two playing instances, and the second channel content corresponds to a second playing instance of the at least two playing instances;
  detect, on the touchscreen, a second operation gesture of the user on the first video display window or the second video display window; and adjust a playing mode of the first channel content or the second channel content according to the second operation gesture of the user and the display mode selected by the user;

wherein the second operation gesture of the user comprises a click operation on the second video display window, and wherein the instructions to adjust the playing mode of the first channel content or the second channel content include instructions to play audio of the second channel content, and turn off audio of the first channel content.

10. The terminal device according to claim 9, wherein the instructions to start the at least two playing instances include instructions to:

detect, on the touchscreen, a click operation of the user on a multi-channel simultaneous watching portal displayed on a display screen of the terminal device;

instruct, according to the click operation of the user, the display screen to display a channel selection page, wherein the channel selection page comprises M video icons corresponding to M pieces of channel content, M is a positive integer, and M≥2;

receive, on the touchscreen, a selection operation of the user on at least two of the M video icons; and start at least two playing instances according to the selection operation of the user.

11. The terminal device according to claim 9, wherein the display mode selected by the user comprises a Picture in Picture (PiP) mode or a Picture out Picture (PoP) mode, and wherein the instructions to cause the display screen to play first channel content in the first video display window and play second channel content in the second video display window include instructions to:

in response to the display mode selected by the user being the PiP mode, determine the first video display window to be a primary display window, determine the second video display window to be a secondary display window, and superimpose the second video display window on the first video display window.

12. The terminal device according to claim 11, wherein the instructions to cause the display screen to play the first channel content in the first video display window and play the second channel content in the second video display window include instructions to:

in response to the display mode selected by the user being the PoP mode, display the first video display window and the second video display window side-by-side.

13. The terminal device according to claim 12, further comprising instruction to detect a third operation gesture of the user on the first video display window or the second video display window, and adjust a playing mode of the first channel content or the second channel content according to the third operation gesture of the user and the display mode selected by the user, wherein the third operation gesture of the user comprises holding down and dragging the second video display window from a second location to a first location, and wherein the instructions to adjust the playing mode of the first channel content or the second channel content include instructions to:

determine whether a center point of the second video display window is moved to a coverage area of the first video display window; and play the first channel content in the second video display window, and play the second channel content in the first video display window in response to determining that the center point of the second video display window is moved to the coverage area of the first video display window.

14. The terminal device according to claim 11, further comprising instruction to detect a third operation gesture of the user on the first video display window or the second video display window, and adjust a playing mode of the first channel content or the second channel content according to the third operation gesture of the user and the display mode selected by the user, wherein the third operation gesture of the user comprises a scaling operation on the second video display window, and wherein the instructions to adjust the playing mode of the first channel content or the second channel content include instructions to:

determine a scaling multiple of the second video display window;

adjust a size of the second video display window based on the scaling multiple; and play the second channel content in the adjusted second video display window.

15. The terminal device according to claim 11, further comprising instruction to detect a third operation gesture of the user on the first video display window or the second video display window, and adjust a playing mode of the first channel content or the second channel content according to the third operation gesture of the user and the display mode selected by the user, wherein the third operation gesture of the user comprises holding down and dragging the second video display window from a second location to a first location, and wherein the instructions to adjust the playing mode of the first channel content or the second channel content include instructions to:

display the second video display window at the first location, and play the second channel content in the second video display window whose location is adjusted.

16. The terminal device according to claim 11, further comprising instruction to detect a third operation gesture of the user on the first video display window or the second video display window, and adjust a playing mode of the first channel content or the second channel content according to the third operation gesture of the user and the display mode selected by the user, wherein the third operation gesture of the user comprises a click operation on the second video display window, and wherein the instructions to adjust the playing mode of the first channel content or the second channel content include instructions to:

play the second channel content in the first video display window, and play the first channel content in the second video display window.

* * * * *